(12) United States Patent
Suzuki

(10) Patent No.: US 6,730,338 B2
(45) Date of Patent: May 4, 2004

(54) SUSPENDING MEMBER, PACKING MATERIAL AND PACKAGE

(75) Inventor: Yasuhiko Suzuki, Shimada (JP)

(73) Assignee: Fuso Industry Co., Ltd., Ogasa-gun (JP)

( * ) Notice: Subject to any disclaimer, the term of this patent is extended or adjusted under 35 U.S.C. 154(b) by 256 days.

(21) Appl. No.: 09/974,849

(22) Filed: Oct. 12, 2001

(65) Prior Publication Data

US 2002/0094360 A1 Jul. 18, 2002

(30) Foreign Application Priority Data

Jan. 15, 2001 (JP) ........................................ 2001/006178

(51) Int. Cl.⁷ .............................................. B65B 29/04
(52) U.S. Cl. .............................. 426/77; 426/82; 426/83; 206/0.5
(58) Field of Search ................................ 426/77, 81–83, 426/110; 206/0.5; B26B 29/04

(56) References Cited

U.S. PATENT DOCUMENTS

| | | | | |
|---|---|---|---|---|
| 2,406,137 A | * | 8/1946 | Eaton .......................... | 426/83 |
| 2,839,406 A | * | 6/1958 | Steinthal ...................... | 426/83 |
| 3,143,834 A | | 8/1964 | Irmscher ........................ | 53/14 |
| 5,672,368 A | | 9/1997 | Perkins ......................... | 426/83 |
| 5,784,763 A | | 7/1998 | Cassidy ........................ | 24/130 |

FOREIGN PATENT DOCUMENTS

GB        817 302 A        7/1959

* cited by examiner

*Primary Examiner*—Drew Becker
(74) *Attorney, Agent, or Firm*—Oliff & Berridge, PLC

(57) ABSTRACT

A package comprising a bag body and a suspending member having a tag and a suspending line, the bag body being formed of a packing material to a given shape, the tag being fixed to the outer surface of the bag body and the suspending line having one end fixed to the tag, a middle portion wound on the tag and the other end fixed to the outer surface. Preferably, the tag has a notch part tapered off, and the middle portion of the line is wound on the notch part of the tag. The package has a suspending line with a sufficient length while it has good external appearance.

7 Claims, 6 Drawing Sheets

(a)

(b)

(c)

SUSPENDING MEMBER, PACKING MATERIAL AND PACKAGE

BACKGROUND OF THE INVENTION

1. Field of the Invention

The present invention relates to a suspending member for suspending a tea bag, a stock bag, and the like, a packing material to which the suspending member is attached, and a package formed of the packing material.

2. Description of the Related Art

Extracting materials such as tealeaf of green tea, black tea, and oolong tea, table luxuries of proceeded powder such as coffee powder, stock materials such as powder of dried bonito planes and dried small sardines, and infusions are provided as contents of tea bag packages. Such an extracting material of a given amount is enclosed in a liquid-permeable, bag body. To the outer surface of the bag body is fixed one end of a suspending line. The other end of the suspending line is fixed to a tag. The tag is made of papers, plastics, or the like. The tag is fixed to the outer surface of the bag body, whereby the suspending line is inhibited from being entangled. The bag body and the suspending line are enclosed on the whole in an outer bag. In such a packing form, when extracting, the tag is get out of the bag body, the bag body is immersed or in contact with in hot water, cold water or the like in a vessel, and the bag body is oscillated by the suspending line whereby extraction of the contents is done.

In the above existing package, however, the suspending line cannot be prolonged due to the occurrence of entanglement of the suspending line with the outer bag or a machine for manufacturing the package. Therefore, when extracting, the suspending line tends to fall into the vessel. As the suspending line falls into the vessel, the tag may fall into the vessel and become in contact with hot water, cold water or the like. Such contact is not sanitary.

In order to overcome this problem, there has been proposed twofold or threefold winding of the suspending line on the bag body. However, such windings result on the whole in the external appearance of the package worse, and the occurrence of catching of the outer bag in the suspending line, whereby enclosing the suspending line in the outer bag become difficult. Further, during the package manufacturing process, threefold or threefold winding operation of the suspending line is difficult.

SUMMARY OF THE INVENTION

The present invention has been provided in order to overcome the above-explained problems. The object of the invention is to provide a suspending member, a packing material to which the suspending member is attached, and a package formed of the packing material, which are capable of having a suspending line of a sufficiently long length and good external appearance, and being easily manufactured.

In various exemplary embodiments; there is provided an invention of a suspending member comprising a thin-plate tag and a suspending line having one end fixed to the tag, a middle portion wound on the tag and the other end fixed to another member.

This invention separately provides that the suspending line can suspend another member because one end thereof is fixed to the tag and the other end thereof is fixed to another member such as a bag body. Further, the suspending line can have a sufficiently long length because a middle portion of the suspending line is wound on the tag.

This invention separately provides that the tag has a notch part tapered off, and the middle portion of the suspending line is wound in the notch part of the tag.

This invention separately provides that the suspending line is wound stably on the tag because a middle portion of the suspending line is wound in the notch part of the tag. Therefore, the suspending line is inhibited from accidentally being shifted. Further, the suspending member has enhanced external appearance.

In various other exemplary embodiments, there is provided an invention of a packing material comprising a lengthy, liquid-permeable sheet and a suspending member having a tag and a suspending line of one end, a first middle portion, a second middle portion and the other end, one end being fixed to the tag, the first middle portion being wound on the tag, and the tag and the other end being fixed to the sheet whereby the second middle portion crosses over the sheet.

This invention separately provides that the suspending member is attached to the sheet by fixing the tag and the other end of the suspending line to the sheet. Therefore, forming the sheet in a bag form will provide a package of tea-bag form with the suspending line.

This invention separately provides that the suspending line can has a sufficiently long length because a middle portion of the suspending line is wound on the tag. Further, because the suspending line is wound on the tag, there has no need for winding the suspending line on a so-formed bag body. Therefore, the package has good external appearance.

This invention separately provides an invention, in which the tag has a notch part tapered off, and the first middle portion of the suspending line is wound in the notch part of the tag.

This invention separately provides that the suspending line is wound stably on the tag because a middle portion of the suspending line is wound in the notch part of the tag. Further, the suspending line is not accidentally gotten out of the tag, whereby the sheet has enhanced external appearance.

In various other exemplary embodiments there is provided an invention of a package comprising a bag body and a suspending member having a tag and a suspending line, the bag body being formed of a packing material to a given shape, the suspending line having one end fixed to the tag, a middle portion being wound on the tag, and the rag and the other end being fixed to the outer surface.

This invention separately provides a package with the suspending member because the tag and the other end of the suspending line are fixed to the outer surface of the bag body. Accordingly, extraction can be done under conditions where the bag body is being suspended by the suspending line.

This invention separately provides that the suspending line can have a sufficiently long length because a middle portion of the suspending line is wound on the tag. Therefore, when extracting, there is no chance of the suspending line and the tag being fallen into a vessel. That is, sanitary extraction can be done. Further, winding operation of the suspending line on the tag is easier than that of the suspending line on the bag body. The package can be manufactured by a process, which require no large change over the existing process. Namely, the package can easily be manufactured. The resultant package is not deteriorated in external appearance because the suspending line is not being wound on the tag.

This invention separately provides a in which the tag has a notch part tapered off, and the middle portion of the line is wound on the notch part of the tag.

According to this invention, the suspending line is wound stably on the tag because a middle portion of the suspending line is wound in the notch part of the tag. Further, the suspending line is not accidentally gotten out of the tag, whereby the package has enhanced external appearance.

BRIEF DESCRIPTION OF THE DRAWINGS

The invention will be described below in detail with reference to the accompanying drawings, in which.

DETAILED DESCRIPTION OF THE INVENTION

Embodiments of the present invention will now be described in detail with reference to drawings.

Figure 1:
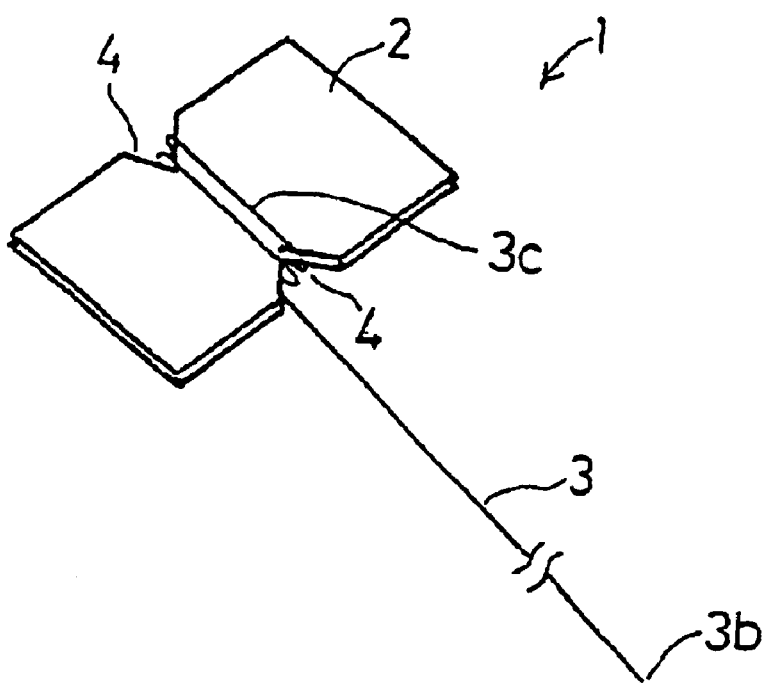
FIG. 1 is a perspective view of a suspending member according to an embodiment of the present invention.

FIG. 1 shows an embodiment of a suspending member 1 comprising a tag 2 and a suspending line 3.

The tag 2 has a thin-plate body on the whole. The tag 2 may be of paper such as thick paper, plastic, rubber or the like. Although the tag 2 has a rectangular shape, the tag of the present invention should not be limited to have such a rectangular body, but also include circular, oval, polygonal such as triangular and pentagonal bodies, and the like.

The tag 2 has two facing notch parts 4. The notch parts 4 are formed opposite to each other, along the long-side edges of the tag 2 at the median points. Each of the notch parts 4 has been formed in a tapered, triangular shape by cutting the tag 2 deep from the edge into the plane. The suspending line 3 will be wound in the notch parts 4, as described below. If the suspending line 3 is wound in the notch parts 4, the suspending line 3 has reduced chance of being shifted from the notch parts 4 away to an outer side, and even if the suspending line 3 is shifted, it is difficult to be gotten out of the tag 2. That is to say, the suspending line 3 is wound surely and stably, and has substantially no change of being getting out of the tag 2. Accordingly, the suspending line 3 is inhibited from accidentally being fallen away. Therefore, the suspending line 3 is being wound on the tag 2 with enhanced external appearance.

Although the notch part 4, in which the suspending line 3 will be wound, has a triangular shape, the notch part of the present invention should not be limited to take a triangular shape, but also include rectangular and circular shapes and the like. Further, the present invention should not be limited to have a pair of notch parts, but also include a single notch part. Further, the location of the notch part should not be limited to the long-side edge of the tag, but also include the short-side edge and the corner, and any other location. In the present invention, the notch part is used as a point across which the suspending line 3 is wound on the tag 2. However, the point is not necessarily limited to a notch part. In the present invention, the point may be a projecting part outwardly from the plane of the tag 2. Please note that in the present invention, a suspending line can have a sufficiently long length even if there is formed no notch part in the tag 2. That is to say, no notch part is required for providing a suspending line of a sufficiently long length.

The one end of the suspending line 3 is fixed to the tag 2. The other end 3b may be fixed to a sheet 11 (refer to FIGS. 2 and 4) or a bag body 21 (refer to FIGS. 5 and 6), which will be described below, or any other members. In FIG. 3, numerical symbol 3a denotes one end of the suspending line 3 fixed to the tag 2. Preferably, one end 3a of the suspending line 3 is fixed to the tag 2 at substantially the central location thereof. If one end 3a is fixed at the location, a middle portion of the suspending line 3 can smoothly be wound in the notch part 4 of the tag 2. The fixing of one end 3a may be done by appropriate means such as supersonic welding or thermal welding.

In this embodiment, a middle portion of the suspending line 3 is being wound on the tag 2. In FIG. 1, numerical symbol 3c denotes a wound portion of the middle portion being wound on the tag 2. In the wound portion 3c, the middle portion of the suspending line 3 is being wound around the tag 2 so as to bridge between the notch parts 4 being positioned opposite to each other. The number of the winding may be from one to several times. Preferably, the number is two to three.

Since a middle portion of the suspending line 3 is being wound on the tag 2, the suspending line 3 may on the whole have a sufficiently long length. Therefore, if a bag body is provided with the suspending member 1, when contents in the bag body is being extracted, there are not occurred falling into a vessel of the suspending line 3 and the tag 2. Therefore, extraction can sanitarily be done if the bag body is used. In this embodiment, since the wound portion 3c is located in the notch parts 4 of the tag 2, the tag 2 has a design accent. As a result, the suspending member 1 has succeeded in enhancing on the whole its external appearance.

Figure 2:
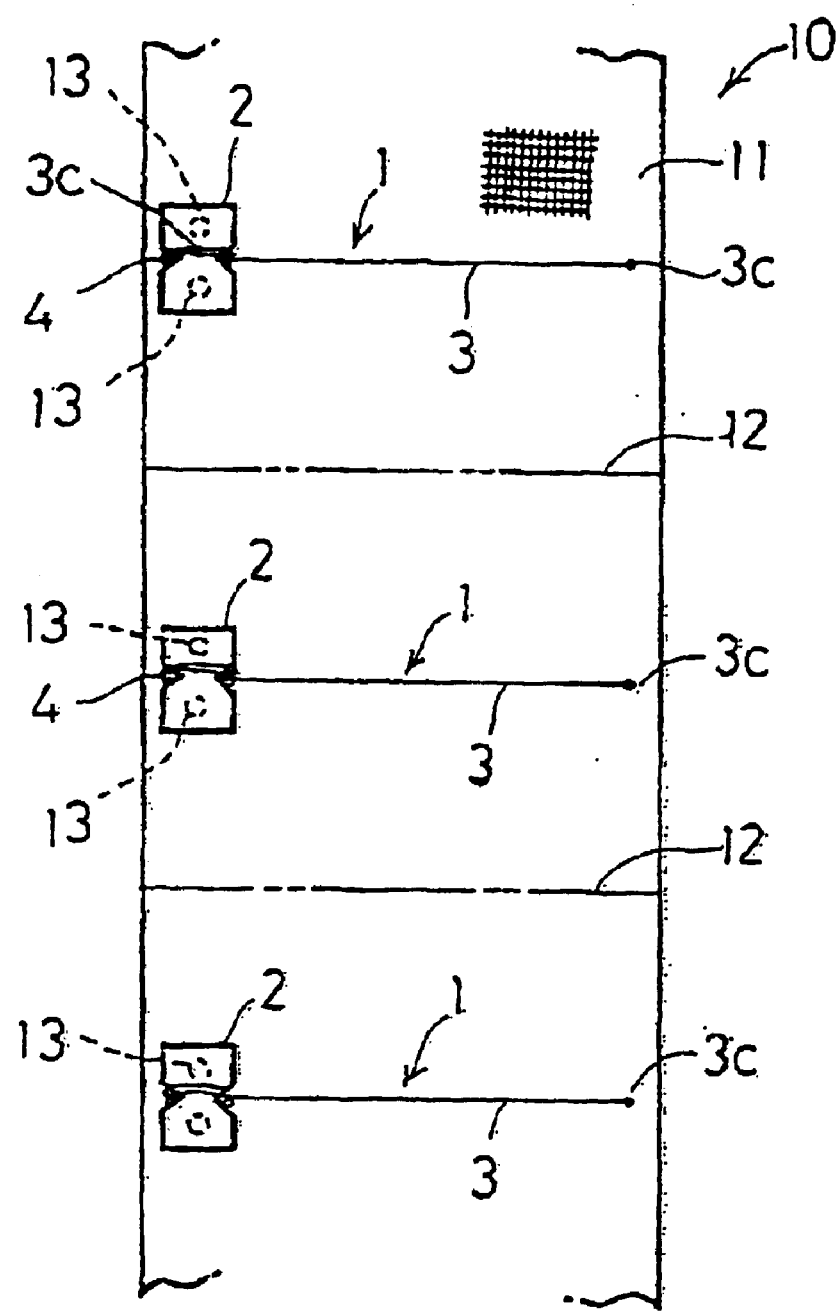
FIG. 2 is a plan view of a packing material according to an embodiment of the present invention.
Figure 3:
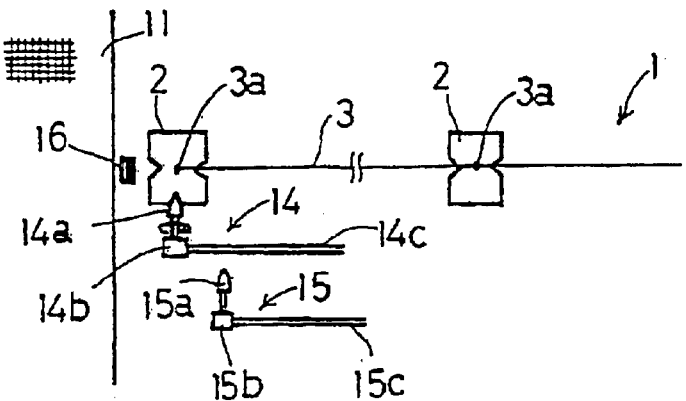
FIGS. 3(a) to (c) are plan views illustrating an exemplary process for producing a packing material.
Figure 3:
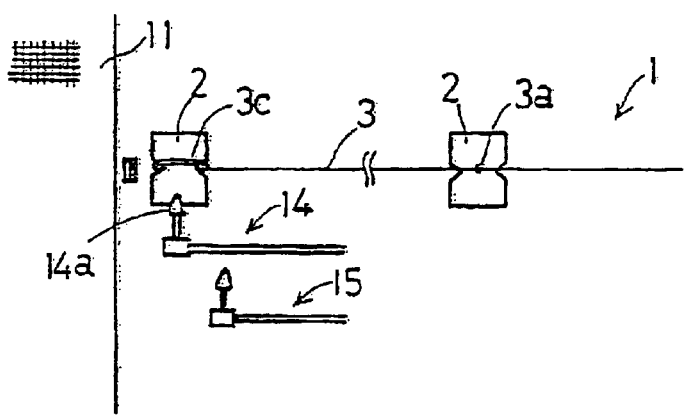
Figure 3:
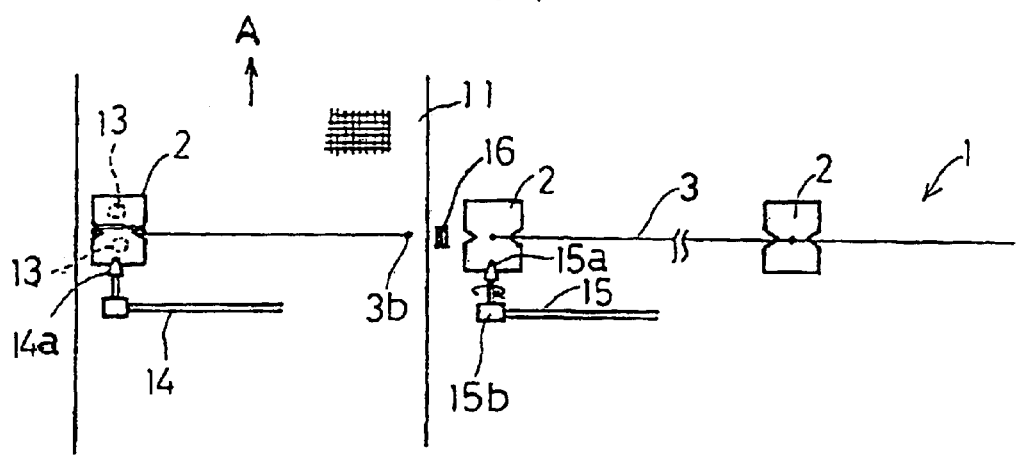

FIG. 2 shows an embodiment of a packing material 10. The packing material 10 comprises a sheet 11 and more than one suspending members 1 described above.

The sheet 11 is of a liquid-permeable, flexible, lengthy material. The sheet 11 may be of nylon gauzes, non-woven fabrics, reticulate synthetic resins, fabrics, water-resistant paper or the like. The sheet 11 is supplied in lengthy material in the longitudinal direction. If the suspending member 1 is attached to one surface (or the top surface) of the sheet 11, the sheet 11 will make a packing material 10.

Pluralities of the suspending members 1 are attached to the sheet 11. The suspending members 1 are spaced from each other by a given pitch in the longitudinal direction of the sheet 11 and placed so as to cross the sheet 11 perpendicular to the longitudinal direction of the sheet 11. A package 20 is formed of the packing material 10. When forming the packing material 10 to the package 20, the sheet 11 is cut along a cutting plane line 12, which has been drawn perpendicularly to the longitudinal direction of the sheet 11. Each suspending member 1 is attached in each area defined by the cutting plane lines 12. Accordingly, cutting the sheet 11 along the cutting plane lines 12 will provide pluralities of the packages 20 each having the packing member 1.

The suspending member 1 is attached to the sheet 11 by fixing the tag 2 to the sheet 11 and the other end 3b of the suspending line 3 to the sheet 11. The fixing may be done by appropriate means such as supersonic welding. In this embodiment, the tag 2 is fixed by supersonic welding to the sheet 11 at two fixing points 13. The two fixing points 13 are respectively in the opposite side areas being divided by the notch parts 4. Therefore, the wound portion 3c is inhibited from being shifted from the tag 2 and the suspending line 3 will make no obstacle in the forming step of the packing material 10 to the package 20. Further, the package 20 has enhanced external appearance and has the suspending line 3 of a sufficiently long length.

FIG. 3 illustrates an embodiment of the process for manufacturing the packing material 10.

In FIG. 3, numerical symbols 14, 15 denote drawing members placed in the vicinity of the suspending material 1. Each of the drawing members 14, 15 is adjusted to draw out the suspending member 1 toward the sheet 11. The drawing members 14, 15 have clamp heads 14a, 15a for clamping the tag 2 and rotary head 14b, 15b for rotating the clamp heads 14a, 15a, respectively. The rotary heads 14b, 15b are connected via rods 14c, 15c to an advance and retreat member such as cylinders (not shown). Accordingly, the drawing members 14, 15 are adjusted movably forward and backward perpendicular to the longitudinal direction of the sheet 11. There is placed a cutter 16, for cutting the suspending line 3, between the suspending line 3 and the sheet 11.

As shown in FIG. 3, the tags 2 have been fixed to the suspending line 3 spaced away from each other by a suitable distance. The suspending line 3 and the tags 2 fixed to the suspending line 3, are supplied perpendicular to the longitudinal direction of the sheet 11. Thereafter, the suspending line 3 is cut by the cutter 16 in the vicinity of the tag 2. The point where the suspending line 3 is fixed to the tag 2 will make the one end 3a of the suspending line 3 in FIG. 1. The sheet 11 is supplied intermittently in the direction shown by A-arrow.

As shown in FIG. 3(a), the clamp head 14a of the drawing member 14 clamps the tag 2, which is approaching most closely to the sheet 11 (hereunder, which is referred to as "first-step tag 2"). Upon claiming, the clamp head 14a is rotated two or three times by driving the rotary head 14b. As the clamp head 14a is being rotated, the first-step tag 2 is being rotated and the suspending line 3 is being wound on the first-step tag 2. As shown in FIG. 3(b), as a result, there is produced the wound portion 3c in which a middle portion of the suspending line 3 is being wound on the tag 2. As described above, because one end 3a of the suspending line 3 has been fixed to the tag 2 at substantially the central location thereof, the wound portion 3c can satisfactorily and surely be produced in the notch parts 4 of the tag 2.

After the wound portion 3c is produced, the drawing member 14 is moved straightly, in a transverse direction over the sheet 11, whereby the whole of the suspending member 1 is drawn over the sheet 11. That is, the first-step tag 2 is transferred together with the suspending line 3 over the sheet 11. When the first-step tag 2 reached one edge of the longitudinal side of the sheet 11, the suspending line 3 is being placed across the sheet 11.

Thereafter, the first-step tag 2 and a back point of the suspending line 3 are simultaneously fixed to the sheet 11 by ultrasonic welding. The ultrasonic welding is done by interposing the sheet 11, the first-step tag 2 and the back point of the suspending line 3 between a ultrasonic vibration hone and a receiving pedestal (both not shown). By the ultrasonic welding, the first-step tag 2 is fixed to the sheet 11 at the fixing points 13. Simultaneously with the ultrasonic welding, the suspending line 3 is cut off by the cutter 16 behind of the back point. As a result, the back point of the suspending line 3 will make the other end 3b fixed to the sheet 1. Thereafter, the sheet 11 is delivered by a given distance in the direction shown by the arrow A.

During these operations on the first-step tag 2, the clamp head 15b of the drawing member 15 is clamping behind the first-step tag 2, another tag 2 (hereunder, which is referred to as "second-step tag 2". When the suspending line 3 fixed to the first-step tag 2 has been cut, the rotary head 15b starts to drive and rotate the second-step tag 2. Thereby, another wound portion 3c of the suspending line 3 is produced in the notch parts 4 of the second-step tag 2. Thereafter, the above-explained operations are done repeatedly. As a result, the packing material 10 (in which the suspending member 1 is attached to the sheet 11) is continuously manufactured.

FIG. 3 illustrates no more than the embodiment. The packing material can be manufactured by other process. For example, after the wound portion 3c has been produced by winding a middle portion of the suspending line 3 on the tag 2, the tag 2 and the suspending line 3 may be supplied to the sheet 11.

Figure 4:
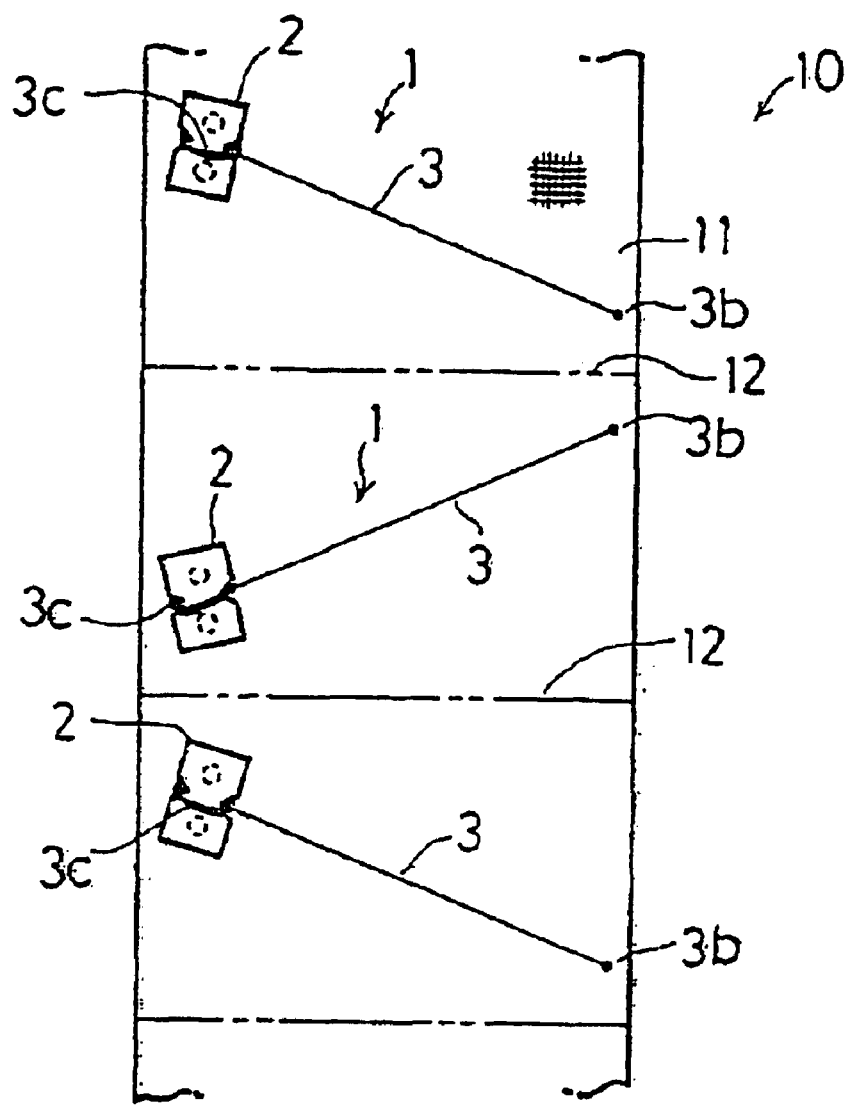
FIG. 4 is a plan view of a packing material according to another embodiment of the present invention, FIGS. 5(a) and (b) illustrate a package according to an embodiment of the present invention, in which (a) is a front view where a suspending line is folded and (b) is a front view where a suspending line is extended.

FIG. 4 shows another embodiment of the packing material 10. In this embodiment, the suspending line 3 of the suspending member 1 is not placed across the sheet 11 perpendicularly to the longitudinal side of the sheet 11, but is placed shifted forward and backward. Even in such situations, if the wound portion 3c has been produced by winding the suspending line 3 on the tag 2, the suspending line 3 can has a sufficiently long length. The packing material 10 can be manufactured by transferring the drawing members 14, 15 forward or backward along the longitudinal side of the sheet 11.

Figure 5:
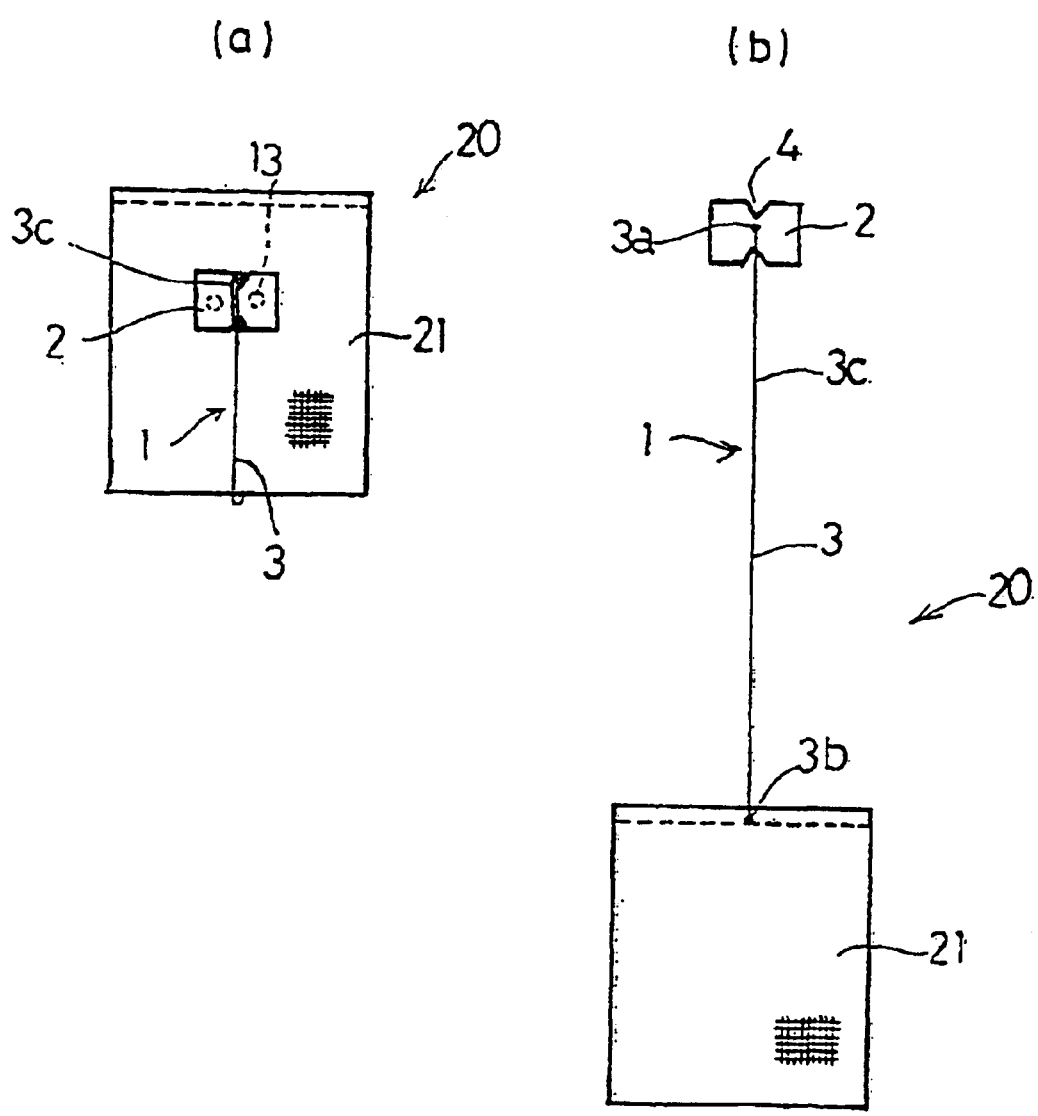
Figure 6:
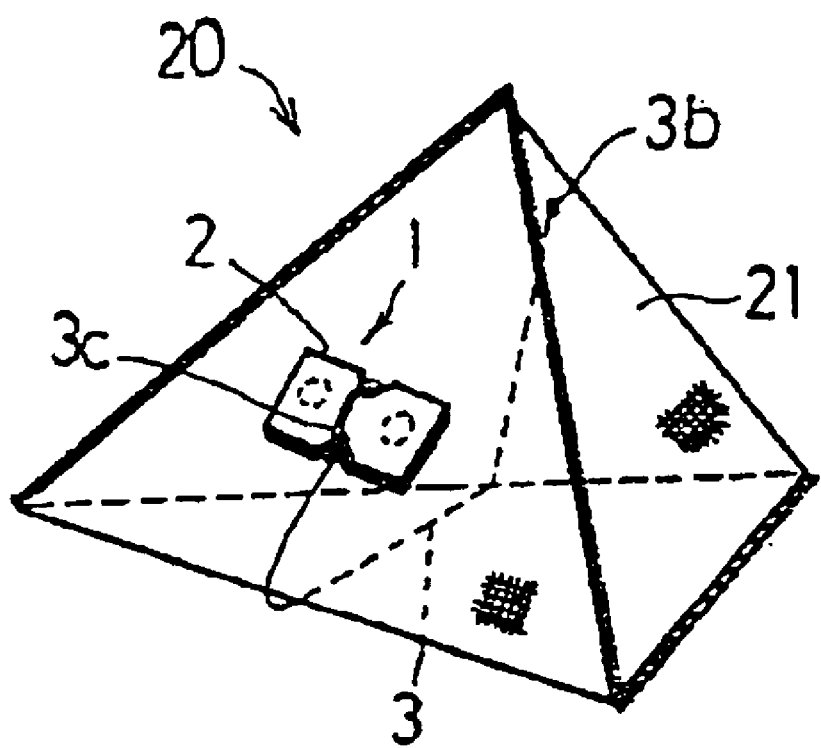
FIG. 6 is a perspective view of a package according to another embodiment of the present invention.

FIGS. 5 and 6 show embodiments of the packages 20 being formed of the packing materials 10, respectively. Each of the packages 20 comprises a bag body 21 and the suspending member 1. In FIG. 5, the bag body 21 has a flat shape and in FIG. 6, the bag body 21 has a tetra shape. However, the bag body 21 should not be limited to have the FIG. 5 or 6 shapes.

The packing material 11 of a liquid-permeable sheet can be formed to the bag body 21 of a given shape. For example, the packing material 11 shown in FIGS. 2 and 4 is formed to a continuous cylinder-like body, either end thereof is sealed, an extracting material is enclosed in the cylinder-like body, and finally the other end of the cylinder-like body is sealed. Since the suspending member 1 has already been attached to the packing material 11, the resultant bag body 21 has already the suspending member 1.

In the suspending member 1, the tag 2 is fixed to the outer surface of the bag body 21 and the other end 3b of the suspending line 3 is also fixed to the outer surface of the bag body 21. When using the package 20, the tag 2 is get out of the bag body 21, the bag body 21 is suspended by the suspending line 3 and immersed into hot water or cold water in a vessel whereby extraction of the extracting material is done.

In this package 20, because the suspending line 3 is being wound on the tag 2 to produce the wound portion 3c, the suspending line 3 can have a sufficiently long length. Therefore, when extraction is being done, there is no chance of the suspending line 3 and the tag 2 being fallen into the vessel. That is, sanitary extraction can be done. Further, there is no need, of making, for providing the suspending line 3 of a sufficiently long length, a loosen portion in the suspending line 3, which may entangle with an outer bag, a manufacturing machine and the like. Therefore, the package 20 can smoothly be manufactured.

Furthermore, there has no need of winding the suspending line 3 on the bag body 21 because the suspending line 3 has been wound on the tag 2. The wound portion 3c is less remarkable than a wound portion produced by winding the suspending line 3 on the bag body 21. Therefore, the external appearance of the package 20 is good. The winding operation of the suspending line 3 on the tag 2 is easily been conducted. If the suspending line 3 is wound on the tag 2, there is no need for largely changing the conventional manufacturing process. Therefore, the package 20 can easily be manufactured.

As set forth on the foregoing pages, the present invention provides a suspending member having a suspending line of a sufficient long length because a middle portion of the suspending line is being wound on the tag.

The present invention provides a packing material having a suspending line of a sufficient long length because a middle portion of the suspending line has been wound. Further, there has no need for winding the suspending line on a final bag body because the suspending line has being wound on the tag. Therefore, the package has good external appearance.

Further, the present invention provides a package having a suspending line of a sufficiently long length because a middle portion of the suspending line has been wound on a tag. Therefore, when extracting, there is no chance of the suspending line and the tag being fallen into a vessel. That is, sanitary extraction can be done. Further, winding operation of the suspending line on the tag is easier than that of the suspending line on the bag body. The package can be manufactured by a process, which requires no large change over the existing process. Namely, the package can easily be manufactured. The resultant package is not deteriorated in external appearance because the suspending line is not being wound on the tag.

What is claimed is:

1. A suspending member comprising:
   a thin-plate tag with a front surface and back surface;
   a suspending line having one end fixed to the tag;
   a middle portion of the line around the front and back wound surfaces of the tag; and
   the other end of the line fixed to another member.

2. A suspending member according to claim 1, in which the tag has a notch part tapered off, and the middle portion of the suspending line is wound in the notch part of the tag.

3. A packing material comprising:
   a lengthy, liquid-permeable sheet;
   a suspending member having a tag with a front surface and back surface and a suspending line with one end fixed to the tag;
   a first middle portion of the line;
   a second middle portion of the line, the first middle portion being wound around the front and back surfaces of the tag, and the tag and the other end being fixed to the sheet whereby the second middle portion crosses over the sheet.

4. A packing material according to claim 3, in which the tag has a notch part tapered off, and the first middle portion of the suspending line is wound in the notch part of the tag.

5. A package comprising:
   a bag body;
   a suspending member having a tag with a front surface and back surface and a suspending line, the bag body being formed of a packing material to a given shape, the suspending line having one end fixed to the tag;
   a middle portion of the line being wound around the front and back surfaces of the tag, and the tag and the other end being fixed to the outer surface of the bag body.

6. A package according to claim 5, in which the tag has a notch part tapered off, and the middle portion of the line is wound in the notch part of the tag.

7. A suspending member according to claim 1, in which the middle portion is wound only around the tag.

* * * * *